United States Patent

Matsuyoshi et al.

[11] 4,174,761
[45] Nov. 20, 1979

[54] RUNNING TRAVEL MANEUVERING APPARATUS FOR AN ENGINEERING WORK VEHICLE

[75] Inventors: Hideaki Matsuyoshi; Yukio Shimono, both of Sakai; Yuji Tsutsui, Osaka; Shigeru Miyuki, Sakai; Takao Watanabe, Osaka; Hideaki Mizota, Sakai, all of Japan

[73] Assignee: Kubota, Ltd., Osaka, Japan

[21] Appl. No.: 889,589

[22] Filed: Mar. 23, 1978

[30] Foreign Application Priority Data

Apr. 18, 1977 [JP] Japan .................... 52-49076[U]

[51] Int. Cl.² .......................................... B62D 11/08
[52] U.S. Cl. ................................ 180/6.7; 180/77 S; 74/479
[58] Field of Search ................. 180/6.7, 6.2, 77 S; 74/471 R, 479

[56] References Cited

U.S. PATENT DOCUMENTS 2,827,715  3/1958  Wagner ........................ 180/77 S
3,257,013  6/1966  Arnold .......................... 180/77 S

FOREIGN PATENT DOCUMENTS 1168457  9/1958  France ......................... 180/77 S
834202   5/1960  United Kingdom ........ 180/77 S Primary Examiner—John A. Pekar
Attorney, Agent, or Firm—Edwin E. Greigg

[57] ABSTRACT

An earth handling vehicle is proposed which is capable of traveling forwardly or rearwardly to accomplish digging and loading operations, said vehicle having a chassis supported for movement on the earth by a track mechanism. The vehicle is further provided with an engine, transmission, a gearshift lever and a main clutch and further includes a maneuvering apparatus comprising front and rearwardly disposed interconnected actuators associated with steering clutches and lever mechanisms for operation of the actuators. Also, included is a supplemental clutch actuator lever which includes a portion that is operably interconnected with at least one actuator lever.

5 Claims, 3 Drawing Figures

RUNNING TRAVEL MANEUVERING APPARATUS FOR AN ENGINEERING WORK VEHICLE

BACKGROUND OF THE INVENTION

This invention relates in an engineering work vehicle comprising an operator's seat changeable to face forward and rearward for performing the work; an engine unit with engine, main clutch and transmission gearing; and a running apparatus on each lateral side of the vehicle, each with a steering clutch, for independently connecting and disconnecting the drive; to a running travel maneuvering apparatus comprising: dual actuators for the said main clutch, one on forward side and the other on rearward side of the operator's seat; a gearshift lever on forward side of the seat; and dual steering levers for actuation of said independent connecting and disconnecting of each of the steering clutches, thus for commanding thereby travel direction of the vehicle, with one steering lever on forward side and the other on rearward side of the seat with respect to each steering clutch, thus two steering levers for the right and left running apparatuses in all on each of the forward and rearward sides of the seat.

In operation of the vehicle of such type, it is desirable for maintaining safe running travel that the operator maneuvers the vehicle with both hands gripping the two steering levers, in the posture proper to the maneuvering. However, in the case for instance of digging a frequently bending or meandering ditch with a backhoe apparatus provided on rearward side of the vehicle, the operator's seat should face rearward and when required to operate the gearshift lever provided only on the forward side of the seat then the operator must be in a posture twisted aside for gripping the gearshift lever with one hand and for gripping with the other hand the main clutch actuator on the rearward side of the seat, which latter is compulsorily in such lever type upstanding at a position remote from both of the steering levers if there is no sufficient space available around the seat as is actually the case in small or medium size vehicle. Returning to stable rearward facing posture after the gearshifting, the operator should change the gripping of both hands to grip the two steering levers from the said gearshift position, i.e. one from the gearshift lever and the other from the main clutch actuator lever. In such changing over of the gripping, the operator is apt to carelessly release for a period of time the clutch actuator free to connect the drive, and in view of narrow and poky construction around the seat, the free released time may considerably be long and there is thus a danger of accidentally starting the travel of the vehicle. In order to prevent such accidental running travel, it often becomes imperative that the gripping of the clutch actuator should intermediately be passed from one hand to the other, i.e. both hands should first grip the clutch actuator after releasing one hand from the gearshift lever and securely gripping the clutch actuator with the said one hand the other hand should only in that state be released to move near one steering lever for that hand, which is however rather a troublesome operation.

SUMMARY OF THE INVENTION

In view of the actual situation as above, this invention has as its object to prevent the said accidental running travel and to make the operation easy, only by applying simple improvement, even in the case where there is no ample space available around the operator's seat and so the clutch actuator on the rearward side of the seat is compulsorily in lever type upstanding at a position remote from both of the steering levers.

To attain the object, the running travel maneuvering apparatus for an engineering work vehicle of the type as described hereinbefore has according to this invention the clutch actuator on rearward side of the operator's seat, which has grip or handling portion extended transversely to the vehicle so as to be near the handling portions of the two steering levers both on the same rearward side of the seat.

Thus, by means of applying the improvement only of extending in transverse direction to the vehicle the handling portion of the clutch actuator so as to be near the handling portions of both of the steering levers, it has now been made possible to maintain the clutch operation during the time of changing from the posture for operating the gearshift lever to the posture proper for operation of both of the steering levers, even in the case where the clutch actuator is compulsorily in lever type upstanding at a position remote from both of the steering levers, by sliding the hand gripping the clutch actuator, and to make it rapid to change the gripping from the clutch actuator to the steering lever, so making the time very short when the clutch actuator is released free and preventing the accidental starting of the travel and at the same time making the operation easy. Other objects and advantages of this invention will be clear from the detailed description given hereunder with reference to the accompanying drawings.

BRIEF DESCRIPTION OF THE DRAWINGS

The drawings show, by way of example, an embodiment of the running travel maneuvering apparatus for an engineering work vehicle according to this invention, in which.

DETAILED DESCRIPTION OF A PREFERRED EMBODIMENT

Figure 1:
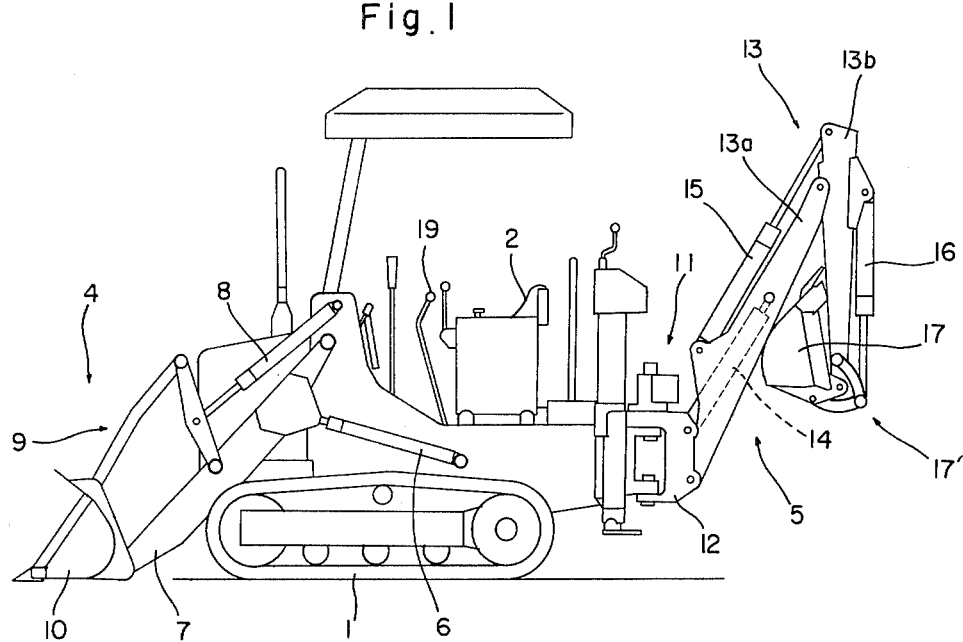
FIG. 1 is an overall side elevation of the vehicle.
Figure 3:
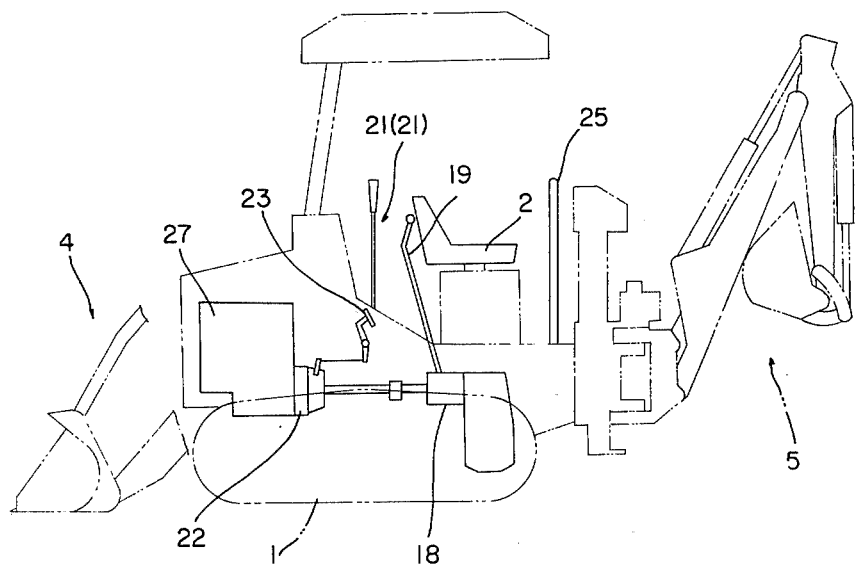
FIG. 3 is a schematic side view showing the driving system.

An embodiment of this invention is now described hereunder with reference to the drawings.

An earth handling vehicle is constructed with: operator's seat 2 freely changeable to face forward and rearward, provided on vehicle body equipped with crawler running apparatus 1; and a shovel apparatus 4 and a backhoe apparatus 5 provided on forward and rearward sides of the vehicle body, respectively; thus adapted to selectively maneuver each of the two apparatuses 4, 5 by changing the direction of the seat 2 to face forward and rearward.

The shovel apparatus indicated generally at 4 is of such construction that an arm 7 is pivotally connected, as shown, to the vehicle body, for free up-and-down movement by a lift cylinder 6. A shovel 10 is mounted on the extremity of the arm 7, for free up-and-down movement by a tilt cylinder 8 and the link mechanism indicated at 9.

The backhoe apparatus 5 is of such construction that an arm bracket 12 is pivotally connected to the vehicle body and arranged to oscillate, about an upright shaft means by a rotation mechanism indicated generally at 11. The backhoe comprises a mechanism for its operation and further includes an arm 13 comprising a boom portion 13a pivotally connected to the bracket 12. These elements are motivated by a boom cylinder 14. The free end of the boom portion, i.e., 13a, is operable in a usual manner and to the free end is attached an arm portion 13b and a cylinder 16 for operating the bucket 17 through a link mechanism 17, all of which will be understood by those skilled in this art.

Figure 2:
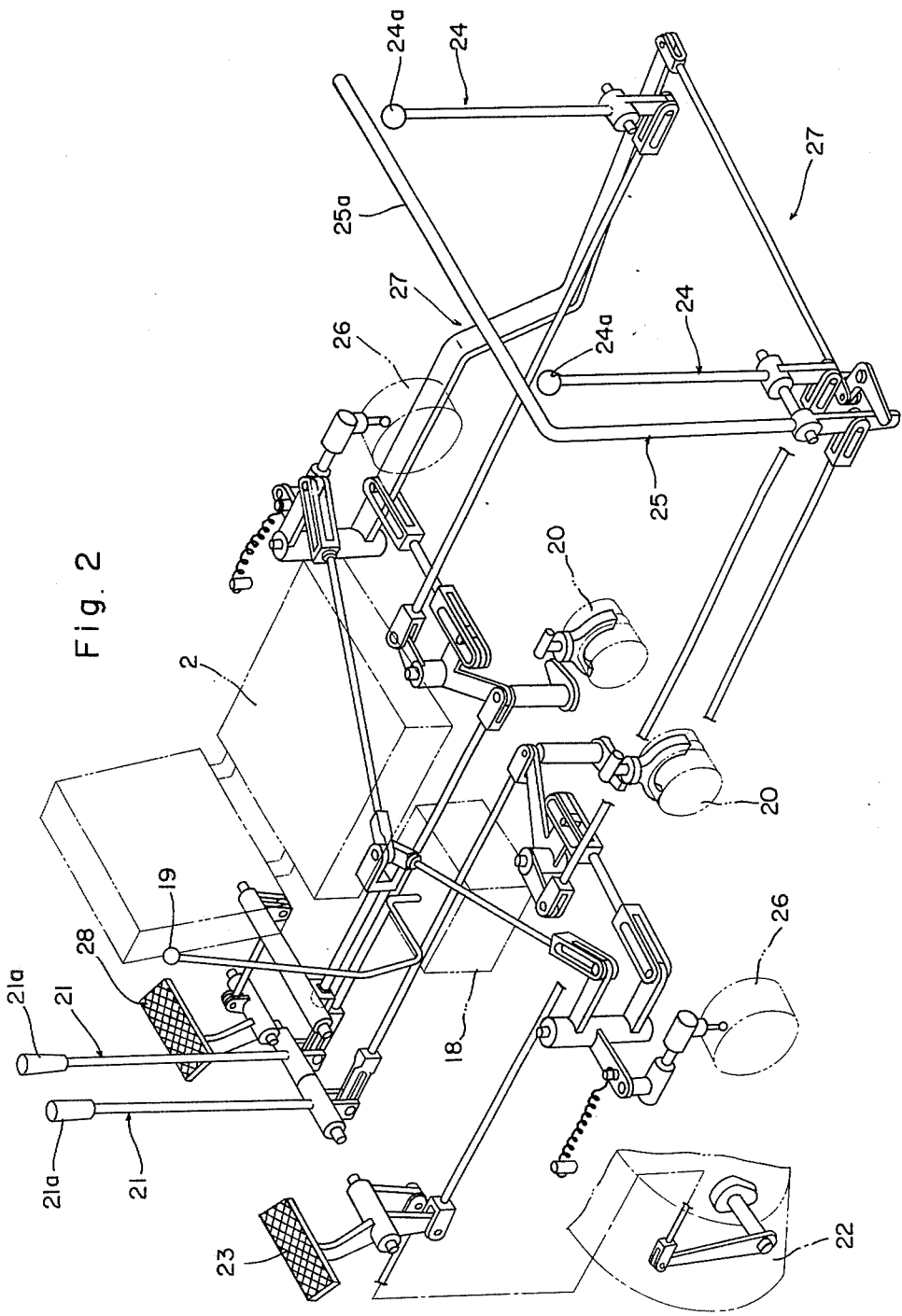
FIG. 2 is a perspective view showing the system for maneuvering.

By referring at this time, particularly to FIG. 2, it will be seen that there are disposed toward the front of the vehicle body, with respect to the operator's seat 2; a gearshift lever 19 for actuation of the transmission gearing 18 which is operatively connected with engine 27. In relative proximity thereto are provided two steering levers 21 spaced apart from each other and supported on the same shaft which are operatively connected with the respective steering clutches 20 and thereby are arranged to control directional travel by disengaging operation of the respective clutches 20. Beyond these elements and positioned toward the front is a pedal type actuator 23 for a clutch 22 which is associated with the transmission system. With further reference to FIG. 2, and to the rear of the vehicle there are disposed: two upstanding steering levers 24 that are spaced apart from each other which are operatively connected with the aforementioned two frontal steering levers 21. Also positioned to the rear is lever-type clutch actuator 25 operatively connected with the aforementioned pedal-type forwardly mounted clutch actuator 23. The front and rear steering levers 21, 24 respectively each have hand portions 21a, 24a, respectively. The clutch actuator lever 25 is shown in FIG. 2 as being disposed near to and laterally outwardly of one steering lever 24 and on the same side of the vehicle as the gearshift lever 19. This clutch actuator lever 25 is constructed of L-shape rod, and its lower portion is pivotally supported on a horizontal shaft which extends transversely relative to the vehicle. As shown, the rod 25 includes a horizontally disposed grip portion 25a which extends transversely of the vehicle and in close proximity to the two steering levers 24 for convenience in operation.

It is believed to be apparent that with the cooperation of the elements discussed above, one skilled in the art can appreciate the facility and ease with which the operator of the vehicle which includes these controls can cause the vehicle to maneuver. Accordingly, when changing from a gearshift position with one of the operator's hands gripping the gearshift lever 19 and the other gripping the clutch actuator lever 25, one can quickly change to a steering operation with both hands gripping the steering levers 24. Thus, the operator may maintain the standstill state of the vehicle by sliding the hand which grips the clutch actuator lever 25, along the horizontally extending bent lever portion thereof designated as the handling portion 25a, to a portion near one steering lever 24 on the remote side from the upright stem portion of the clutch actuator lever 25, then take a posture proper to grip both of the steering levers 24. It is believed to be clear that one can slide one hand on the rod 25a so as to be able to grip said one steering lever 24, while changing at the same time the gripping of the other hand from the gearshift lever 19 to the other steering lever 24. In this manner it is thus possible to perform the changeover of the operator's hands instantaneously and thereby prevent accidental operation or movement of the vehicle through an unintended connection of the drive means with a freely and unintended release of the clutch actuator.

The crawler of the mechanism indicated at 1 is, as usual, arranged on each side of the vehicle and on each is provided with brakes 26—26 in each line of the driving system. It will also be observed from FIG. 2 that each of the steering levers 21, 24 is operatively connected with the brakes 26—26 via a pin-in-slot type link mechanism, and thus are adapted to actuate the brakes subsequent to a disengaging operation of the steering clutch 20.

Further, FIG. 2 also illustrates a link mechanism 27 connected on the one hand to the clutch actuators 23, 25 and on the other hand to the brakes 26—26, thus making it possible to have the clutch actuators 23, 25 perform the dual function of actuating the clutch 22 and further the brakes 26 as well. In addition as also shown in FIG. 2, a pedal 28 positioned toward the front of the operator's seat 2 is also operatively connected to the brakes 26—26 via pin-in-slot type link mechanism. Thus, the brakes 26—26 may be actuated either by a disengaging operation of the clutch actuator 23 or 25, subsequent to disconnecting the drive, or else by operating the pedal 28.

The foregoing relates to a preferred exemplary embodiment of the invention, it being understood that other embodiments and variants thereof are possible within the spirit and scope of the invention, the latter being defined by the appended claims.

We claim:

1. An earth handling vehicle capable of moving in opposite directions comprising a chassis supported relative to the earth by laterally disposed drivable track mechanisms and steering clutches therefor, said chassis further including an engine transmission, gearshift lever therefor and maneuvering apparatus comprising front and rearwardly disposed interconnected actuators associated with a main clutch means that is drivably connected to said transmission, one each front and rearwardly disposed interconnected steering levers connected to said steering clutches, each of said steering levers provided with hand grip portions, further wherein said rearwardly disposed actuator further includes a portion that extends transversely of said vehicle and in close proximity to said hand grip portions of said steering levers.

2. An earth handling vehicle as claimed in claim 1, further wherein said rearwardly disposed actuator includes an inverted L-shaped member.

3. An earth handling vehicle as claimed in claim 2, further wherein said L-shaped member is pivotally supported on a horizontal shaft which extends transversely of said vehicle.

4. An earth handling vehicle as claimed in claim 3, further wherein said L-shaped member is interconnected with a foot operated means positioned toward the front of said vehicle.

5. An earth handling vehicle as claimed in claim 2, further wherein said rearwardly disposed interconnected steering levers are spaced laterally of each other relative to said vehicle and said L-shaped member includes a dependent leg portion mounted outwardly of at least one of said steering levers.

* * * * *